United States Patent
Ayub et al.

(10) Patent No.: US 10,942,745 B2
(45) Date of Patent: *Mar. 9, 2021

(54) FAST MULTI-WIDTH INSTRUCTION ISSUE IN PARALLEL SLICE PROCESSOR

(71) Applicant: International Business Machines Corporation, Armonk, NY (US)

(72) Inventors: Salma Ayub, Austin, TX (US); Jeffrey C. Brownscheidle, Seattle, WA (US); Sundeep Chadha, Austin, TX (US); Dung Q. Nguyen, Austin, TX (US); Tu-An T. Nguyen, Austin, TX (US); Salim A. Shah, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/141,285

(22) Filed: Sep. 25, 2018

(65) Prior Publication Data

US 2019/0026113 A1    Jan. 24, 2019

Related U.S. Application Data

(63) Continuation of application No. 15/939,367, filed on Mar. 29, 2018, now Pat. No. 10,120,693, which is a continuation of application No. 15/093,192, filed on Apr. 7, 2016, now Pat. No. 9,996,359.

(51) Int. Cl.
*G06F 9/38* (2018.01)

(52) U.S. Cl.
CPC .......... *G06F 9/3851* (2013.01); *G06F 9/3836* (2013.01); *G06F 9/3855* (2013.01); *G06F 9/3867* (2013.01); *G06F 9/3887* (2013.01)

(58) Field of Classification Search
CPC .... G06F 9/3851; G06F 9/3867; G06F 9/3855; G06F 9/3836; G06F 9/3887
See application file for complete search history.

(56) References Cited

U.S. PATENT DOCUMENTS

| | | | |
|---|---|---|---|
| 6,260,133 B1 | 7/2001 | Teruyama | |
| 7,409,589 B2 | 8/2008 | Mack et al. | |
| 7,711,929 B2 | 5/2010 | Burky et al. | |
| 2004/0181652 A1* | 9/2004 | Ahmed | G06F 9/30036 712/215 |
| 2011/0320771 A1* | 12/2011 | Mejdrich | G06F 12/0853 712/201 |
| 2012/0291037 A1 | 11/2012 | Venkataramanan | |

(Continued)

OTHER PUBLICATIONS

Hennessy and Patterson, Computer Architecture A Quantitative Approach, 1996, Morgan Kaufmann, Second edition, 7 pages (Year: 1996).*

(Continued)

*Primary Examiner* — Jyoti Mehta
(74) *Attorney, Agent, or Firm* — Mark Bergner

(57) ABSTRACT

Fast issuance and execution of a multi-width instruction across multiple slices in a parallel slice processor core is supported in part through the use of an early notification signal passed between issue logic associated with multiple slices handling that multi-width instruction coupled with an issuance of a different instruction by the originating issue logic for the early notification signal.

18 Claims, 4 Drawing Sheets

(56) References Cited

U.S. PATENT DOCUMENTS

| | | | |
|---|---|---|---|
| 2012/0303647 A1 | 11/2012 | Gutlapalli et al. | |
| 2014/0075163 A1* | 3/2014 | Loewenstein ....... | G06F 9/30043 712/225 |
| 2016/0202990 A1* | 7/2016 | Brownscheidle ..... | G06F 9/3851 712/23 |
| 2016/0202992 A1* | 7/2016 | Brownscheidle ..... | G06F 9/3851 712/23 |
| 2018/0336038 A1* | 11/2018 | Brownscheidle ..... | G06F 9/3851 |

OTHER PUBLICATIONS

List of IBM Patents or Patent Applications Treated as Related, Sep. 25, 2018, 2 pages.

Anonymously; "Fast wakeup of load dependent instructions by a select bypass"; http://ip.com/IPCOM/000216900; Apr. 23, 2012, 2 pages.

IBM; "Issue Queue Bypass Readiness Predictor"; http://ip.com/IPCOM/000193323; Feb. 18, 2010, 2 pages.

U.S. Patent and Trademark Office, Notice of Allowance issued in related U.S. Appl. No. 15/093,192 dated Feb. 7, 2018, 58 pages.

U.S. Patent and Trademark Office, Notice of Allowance issued in related U.S. Appl. No. 15/939,367 dated Jun. 26, 2018, 37 pages.

\* cited by examiner

FAST MULTI-WIDTH INSTRUCTION ISSUE IN PARALLEL SLICE PROCESSOR

BACKGROUND

The invention is generally related to data processing, and in particular to dispatching and issuing instructions in computer processors.

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

In some existing designs, specific resources and pipelines are typically allocated for execution of different instruction streams, and multiple pipelines allow program execution to continue even during conditions when a pipeline is busy. However, resources may still be tied up for pipelines that are busy, and when all the pipeline(s) assigned to an instruction stream are busy, the instruction stream may become stalled, reducing the potential throughput of the processor core. Some existing designs are also limited in terms of the different types of instructions that may be supported, such that instructions are generally limited to supporting a single instruction width such as 32-bits, 64-bits, 128-bits, etc.

SUMMARY

According to an embodiment of the present invention, a circuit arrangement includes a plurality of parallel execution slices configured to execute instructions from one or more instruction streams, the plurality of parallel execution slices including first and second execution slices, first issue logic coupled to the first execution slice, the first issue logic configured to queue instructions dispatched to the first execution slice and to issue queued instructions to the first execution slice for execution thereby, the first issue logic further configured to queue a first portion of a multi-width instruction dispatched to the first execution slice, and second issue logic coupled to the second execution slice, the second issue logic configured to queue instructions dispatched to the second execution slice and to issue queued instructions to the second execution slice for execution thereby, the second issue logic further configured to queue a second portion of the multi-width instruction dispatched to the second execution slice. The first issue logic is further configured to initiate execution of the multi-width instruction by the first and second execution slices by, in a first issue cycle, communicating an early issue notification signal to the second issue logic to cause the second issue logic to prepare for issuance of the multi-width instruction during a second issue cycle, also in the first issue cycle, issuing a queued instruction other than the first portion of the multi-width instruction to the first execution slice for execution thereby, and in the second issue cycle, issuing the first portion of the multi-width instruction to the first execution slice for execution thereby.

According to another embodiment of the invention, a method of executing instructions in a processor core including a plurality of parallel execution slices configured to execute instructions from one or more instruction streams includes, in first issue logic coupled to a first execution slice among the plurality of parallel execution slices, queuing instructions dispatched to the first execution slice and issuing queued instructions to the first execution slice for execution thereby, in second issue logic coupled to a second execution slice among the plurality of parallel execution slices, queuing instructions dispatched to the second execution slice and issuing queued instructions to the second execution slice for execution thereby, and queuing first and second portions of a multi-width instruction in the first and second first and second issue logic, respectively. Such an embodiment also includes, in the first issue logic, initiating execution of the multi-width instruction by the first and second execution slices by, in a first issue cycle, communicating an early issue notification signal to the second issue logic to cause the second issue logic to prepare for issuance of the multi-width instruction during a second issue cycle, also in the first issue cycle, issuing a queued instruction other than the first portion of the multi-width instruction to the first execution slice for execution thereby, and in the second issue cycle, issuing the first portion of the multi-width instruction to the first execution slice for execution thereby.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention.

DETAILED DESCRIPTION

Figure 1:
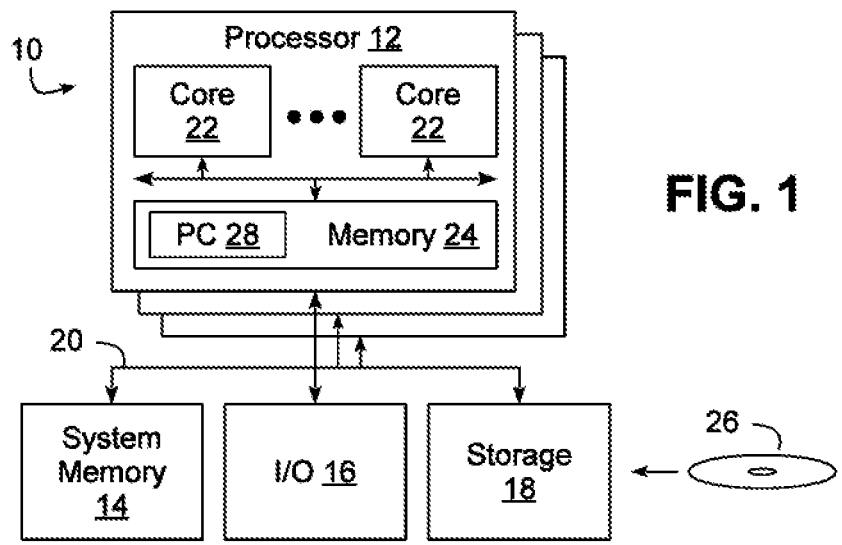
FIG. 1 is a block diagram illustrating an example data processing system in which various techniques disclosed herein may be practiced.

As will become more apparent below, in embodiments consistent with the invention, fast issuance and execution of a multi-width instruction across multiple slices in a parallel slice processor core is supported in part through the use of an early notification signal passed between issue logic associated with multiple slices handling that multi-width instruction coupled with an issuance of a different instruction by the originating issue logic for the early notification signal.

A parallel slice processor core in the illustrated embodiments may be considered to be a processor core that implements a plurality of execution "slices" that generally may be assigned arbitrarily to execute various types of instructions, and that may be combined on-the-fly to execute one or both of multi-width instructions or Single Instruction Multiple Data (SIMD) instructions including multiple data values to be processed by the same instruction. The support for arbitrary assignment of instructions to execution slices may in some embodiments enable an instruction from a particular instruction stream to be routed to a different execution slice when a different execution slice that was handling the instruction stream is busy, while support for multi-width and/or SIMD instructions enhances flexibility and versatility for handling different types of workloads, e.g., productivity workloads, graphical workloads, scientific workloads, network workflows, etc.

Further, in the illustrated embodiments, each execution slice has internal instruction paths that support a specific width, e.g., 32-bits, 64-bits, etc., and for the purposes of this disclosure, a single width instruction is considered to be an instruction that is capable of being handled by a single execution slice, such that a multi-width instruction may be considered to be an instruction that is capable of being partitioned into multiple portions or parts that are each capable of being handled by a single execution slice. As such, a multi-width instruction in some embodiments has a width that is a multiple of the single width instruction supported by each execution slice. In some of the embodiments discussed hereinafter, for example, each execution slice is configured to handle 64-bit instructions, and a multi-width instruction in such an embodiment may be a 128-bit instruction having two halves, portions or parts that are respectively issued and executed in a pair of execution slices that are collectively referred to herein as superslices. It will be appreciated, however, that the principles of the invention may be applied to different instruction widths and/or different multiples of instruction widths in other embodiments, e.g., with slices supporting various instruction widths as well as with superslices formed from more than two slices. Further, it will be appreciated that in some embodiments different execution slices may support different instruction widths, so a multi-width instruction in some embodiments may more generally be considered to have a width that is a sum of the single widths supported by multiple execution slices assigned to handle that instruction.

Now turning to the drawings, wherein like numbers denote like parts throughout the several views, FIG. 1 illustrates an example data processing system 10 consistent with some embodiments of the invention. Data processing system 10 includes one or more processors 12 coupled to various additional components such as system memory 14, input/output (I/O) 16 and storage 18 via one or more communication paths 20, e.g., implemented using one or more buses, networks, interconnects, etc. Each processor 12 may include one or more processor cores 22 and local storage 24, e.g., including internal system memory and/or one or more levels of cache memory. Each processor 12 may be similarly configured in some embodiments, while in other embodiments differently-configured processors may be utilized together. Further in multi-core processor implementations, each core 22 may be similarly or different configured as other cores 22 within the same processor 12. It will be appreciated that the invention may be utilized in a wide variety of system configurations, including single processor and/or multi-processor configurations, as well as single core and/or multi-core configurations. Further, the invention may be utilized in various types of application-specific processors, e.g., graphics processors, network processors, coprocessors, service processors, embedded processors, etc.

In some embodiments, system memory 14 may include random-access memory (RAM) representing the main volatile storage of the system. Further, in some embodiments, a single system memory 14 may be supported, while in other embodiments, the memory may be distributed among a plurality of nodes, with one or more processors 12 implemented within each node and having non-uniform memory access among portions of the memory that are in the same or different nodes in the system. Nodes may also be arranged into various hierarchies, e.g., within different cabinets, racks, cards, slots, etc., and interconnected via high speed networks.

System 10 also includes various input/output (I/O) interfaces and devices 16, which may vary based upon the type of system. For example, in some systems, I/O 16 may include adapters and/or interfaces to one or more external networks, such as private networks, public networks, wired networks, wireless networks, etc. In addition, for a single-user system such as a desktop computer, laptop computer, tablet, mobile device, etc., I/O 16 may also include user input devices such as mice, keyboards, touchscreens, microphones, imaging devices, etc. for receiving user input and graphical displays and/or audio playback devices for displaying information. System 10 may also include a storage subsystem 18, which may include non-removable mass storage drives such as solid state disk drives, hard disk drives, etc., as well as removable drives such as flash drives, optical drives, etc., the latter of which may be used, for example, to read program code and/or data stored on a computer readable medium such as an optical disk 26.

Example program code 28, for example, is illustrated in memory 24, which may represent various types of instructions that may be executed by a core 22 of a processor 12, including, for example, user-level applications, operating systems, firmware, middleware, device drivers, virtualization program code, etc. It will be appreciated that program code 28 may also be stored from time to time in other computer readable media, including both various types of non-volatile and volatile memory such as cache memory, system memory, external storage, removable media, etc.

While the system of FIG. 1 is used to provide an illustration of a system in which the processor architecture of the present invention is implemented, it is understood that the depicted architecture is not limiting and is intended to provide an example of a suitable computer system in which the various techniques disclosed herein may be applied.

Further, it will be appreciated that the techniques described herein may be implemented within a circuit arrangement, which generally represents a physical device or system (e.g., one or more integrated circuit devices/chips, cards, boards, components, systems, etc.) incorporating hardware, and in some instances, software, configured to implement such techniques. In addition, it will also be appreciated that implementations utilizing the herein-described techniques may be distributed at least in part in the form a program product including logic definition code that defines a circuit arrangement and that is stored on a computer readable medium, and that the invention applies equally regardless of the particular type of computer readable media being used to actually carry out the distribution. Logic definition program code, for example, may include generic gate netlists, synthesizable forms, e.g., as described in a hardware description language such as Verilog or VHDL, lower-level, physical descriptions such as GDSII, or other types of program code capable of defining at various levels of detail the functionality and/or layout of a manufactured circuit arrangement. Examples of computer readable media include, but are not limited to, non-transitory, physical, recordable type media such as volatile and non-volatile memory devices, floppy disks, hard disk drives, CD-ROMs, and DVDs (among others).

Figure 2:
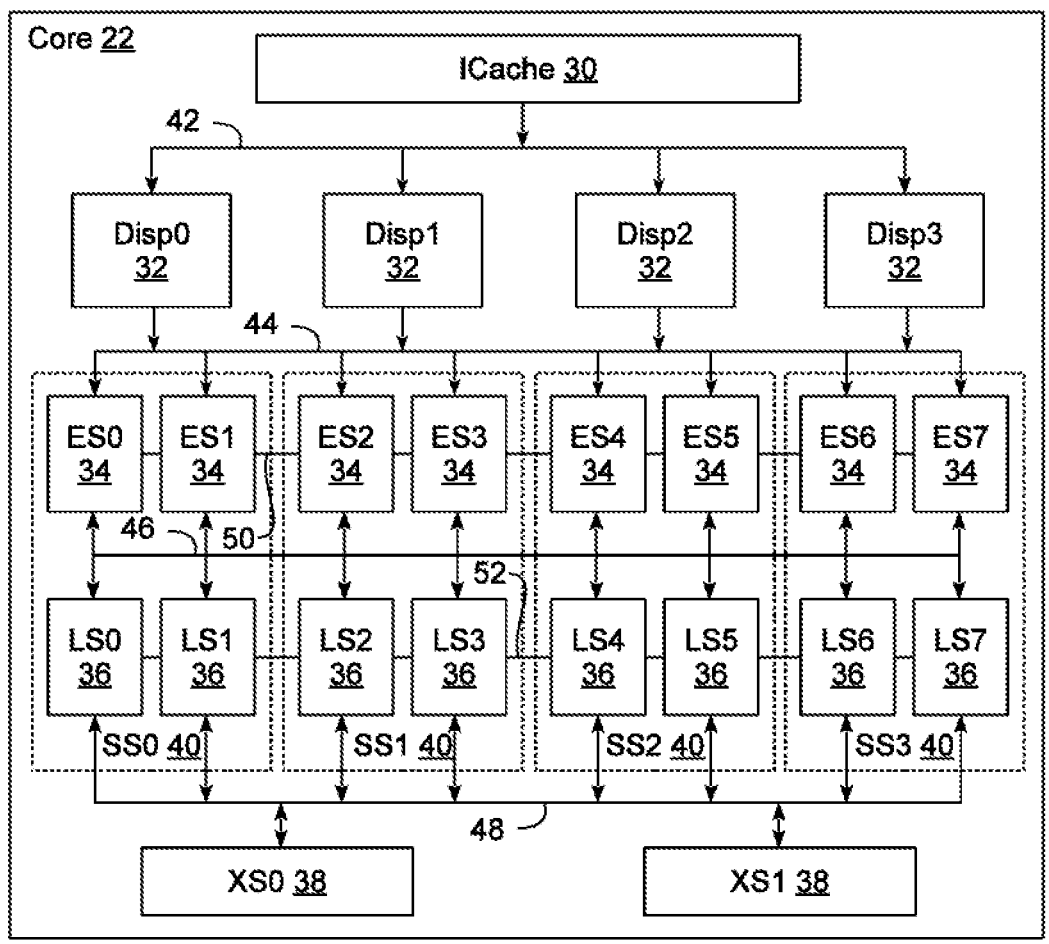
FIG. 2 is a block diagram illustrating further details of an example implementation of one of the processor cores referenced in FIG. 1.

Referring now to FIG. 2, details of an example implementation of processor core 22 of FIG. 1 are illustrated. Processor core 22 in the illustrated embodiment may be implemented as a parallel slice processor incorporating a plurality of "slices" that are capable of operating in parallel with one another, as well as capable of operating independently and/or collectively to handle different types of instructions. Processor core 22 may include an instruction cache (ICache) 30 that stores multiple instruction streams fetched from higher-order cache or system memory and presents the instruction stream(s) to a plurality of dispatch queues (Disp0-Disp3) 32. Control logic within processor core 22 controls the dispatch of instructions from dispatch queues 32 to a plurality of execution slices (ES0-ES7) 34 that are coupled to a plurality of load/store slices (LS0-LS7) 36 (also referred to herein as cache slices) that are in turn coupled to a plurality of translation slices (SX0-XS1) 38 that provide access to a next higher-order level of cache or system memory that may be integrated within, or external to, processor core 22.

In some embodiments, sets of two or more pairs of associated execution slices 34 and cache slices 36 may be logically coupled together into superslices (e.g., SS0-SS3) 40, e.g., to support multi-width instructions and/or SIMD instructions. In other embodiments, however, no such logical coupling may be supported.

Execution slices 34 are coupled to dispatch queues 32 via a dispatch routing network 44 that permits instructions from any of dispatch queues 32 to any of execution slices 34, although complete cross-point routing, i.e., routing from any dispatch queue 32 to any execution slice 34 may not be supported in some embodiments. Execution slices 34 perform sequencing and execution of logical, mathematical and other operations as desired to perform the execution cycle portion of instruction cycles for instructions in one or more instruction streams, and may be identical general-purpose execution slices. In other embodiments, however, processor core 22 may include one or more special-purpose execution slices 34, e.g., to provide optimized execution of particular types of instructions, so different instantiations of execution slices 34 may vary from one another in some implementations. Execution slices 34 may also include multiple internal pipelines in some embodiments for executing multiple instructions and/or portions of instructions. As a result, whether or not a particular execution slice 34 is considered to be "busy" may vary based upon the availability of different pipelines and/or the types of instructions currently being executed by a particular execution slice. Execution slices 34 may also be coupled to one another in some embodiments by an execution slice communication network 50 through which values may be exchanged between execution slices 34, for example when further processing is performed by one execution slice on values generated by another execution slice. A fully-routed (or cross-point) network may be used to implement execution slice communication network 50 in some embodiments. Alternatively, the connections between execution slices 34 may be made only between particular groups of execution slices, e.g., only neighboring slices may be connected in some implementations. Execution slice communication network 50 may also be used for tandem execution of SIMD or large-operand instructions that utilize concurrent/coordinated execution, although execution of such instructions may be performed in a de-coupled manner in some embodiments.

The load-store portion of an instruction execution cycle, (i.e., the operations performed to maintain cache consistency as opposed to internal register reads/writes), may be performed by cache or load/store slices 36, which are coupled to execution slices 34 by a write-back (result) routing network 46. In the illustrated embodiment, any of load/store slices 36 may be used to perform load-store operations for any of execution slices 34, but in other embodiments load/store slices 36 may be limited to handling load-store operations for only subsets of execution slices 34. In addition, execution slices 34 may issue internal instructions concurrently to multiple pipelines, e.g., an execution slice may simultaneously perform an execution operation and a load/store operation and/or may execute multiple arithmetic or logical operations using multiple internal pipelines. The internal pipelines may be identical, or may be of discrete types, such as floating-point, scalar, load/store, etc. Further, a given execution slice may have more than one port connection to write-back routing network 46, e.g., a port connection may be dedicated to load-store connections to load/store slices 36, while another port may be used to communicate values to and from other slices, such as special-purposes slices, or other execution slices. Write-back results may be scheduled from the various internal pipelines of execution slices 34 to write-back port(s) that connect execution slices 34 to write-back routing network 46.

A load-store routing network 52 may also couple load/store slices 36 to one another to provide conversion transfers for execution of SIMD instructions, processing of instructions with data widths greater than a width of individual load/store slices 36 and/or other operations requiring translation or re-alignment of data between load/store slices 36. An I/O routing network 48 may also be used to couple load/store slices 36 to one or more translation slices 38 that provide access to a next higher-order level of cache or system memory that may be integrated within, or external to, processor core 22.

While the illustrated example shows a matching number of load/store slices 36 and execution slices 34, in practice, a different number of each type of slice may be provided according to resource needs for a particular implementation. Further, while four dispatch queues 32, eight execution slices 34, eight load/store slices 36 and two translation slices 38 are illustrated in FIG. 2, it will be appreciated that the numbers of each of these components may vary in different embodiments. In addition, it will be appreciated by those of ordinary skill in the art having the benefit of the instant disclosure that the various networks and interconnects 42-52 may be implemented in a number of different manners, including unidirectional networks, cross-point networks, multiplexed interconnects, and point-to-point interconnects, among others. As such, the invention is not limited to the particular configuration illustrated in FIG. 2.

The dispatch of instructions to execution slices 34 may be implemented in a number of manners consistent with the invention. For example, in some embodiments, the instructions dispatched to execution slices 34 may be full external instructions or portions of external instructions, i.e., decoded "internal instructions." Further, in a given cycle, the number of internal instructions dispatched to execution slices may be greater than one and that not every one of execution slices may receive an internal instruction in a given cycle. Multi-width instructions, i.e., instructions having a width that is a multiple of the instruction size supported by a particular slice, may also be supported in some embodiments, and may span multiple slices. In the illustrated embodiment discussed in greater detail below, for example, individual slices may be configured to handle 64-bit instructions, and superslices of two slices may be configured to handle double-width, or 128-bit, instructions. In other embodiments, different instruction widths (e.g., 16-bit, 32-bit, 64-bit, 128-bit, etc.) and/or different multiples of instruction widths (e.g., 2×, 3×, 4×, etc.), may be supported. Further, in some embodiments, SIMD instructions having multiple data values may be dispatched for coordinated execution by multiple slices. In addition, in some embodiments, instructions from multiple instruction streams may be dispatched, and in some instances, dispatching may route around slices that are currently busy such that alternate slices may be used to handle later instructions from an instruction stream for which earlier instructions have been dispatched to a particular slice. In some embodiments, the use of such a dispatch routing network provides a potential for maintaining all execution slices in an active execution state while performing various types of operations, such as executing SIMD or variable width instruction streams. The configurability also provides the potential for maintaining instruction streams in an active execution state, even while a busy condition is encountered for some slices.

Figure 3:
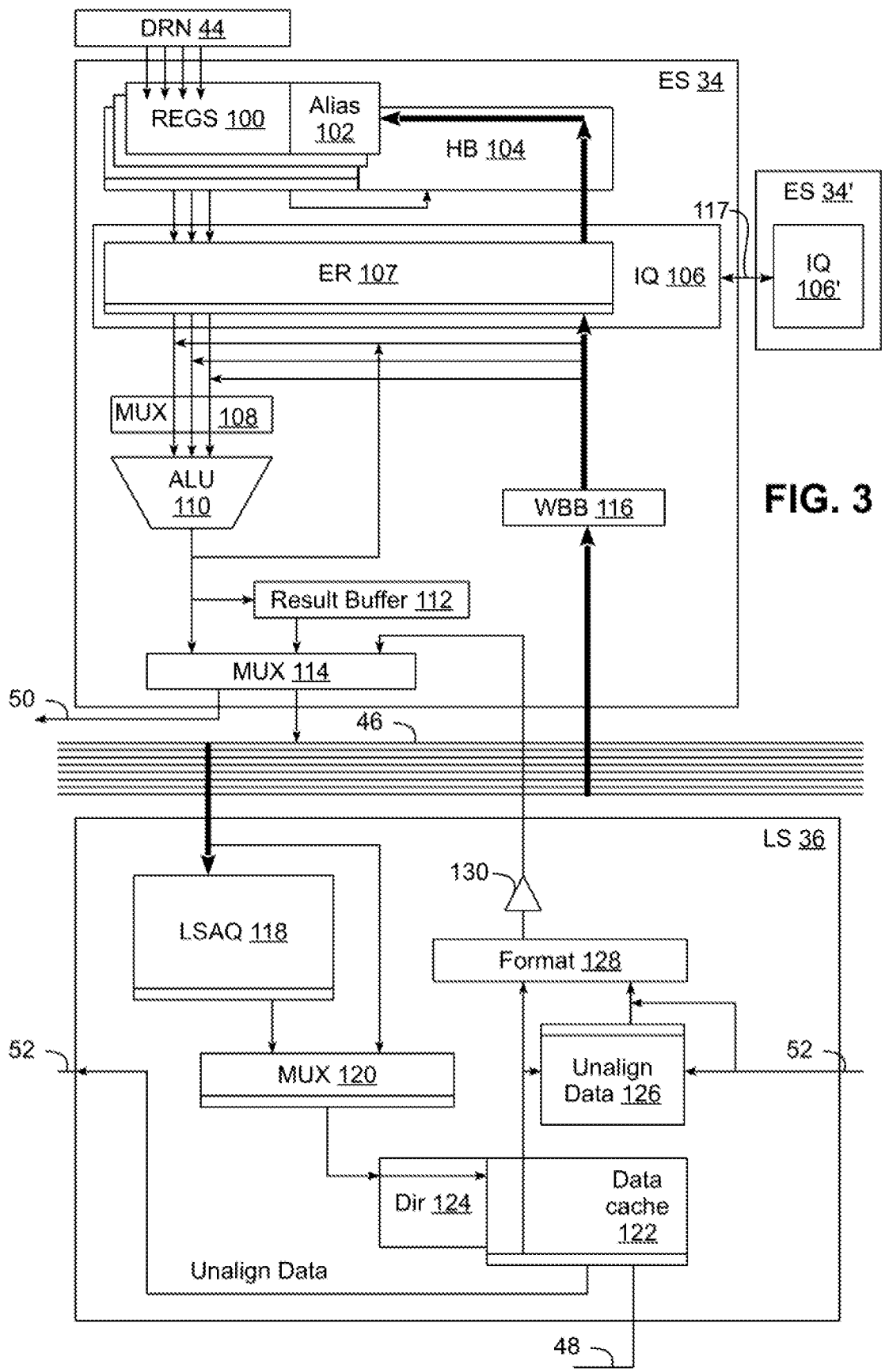
FIG. 3 is a block diagram illustrating an example implementation of one of the execution/cache slice pairs in the processor core of FIG. 2.

Now turning to FIG. 3, it will be appreciated that the internal configuration of each execution slice 34 and load/store slice 36 in processor core 22 may vary considerably in different embodiments, e.g., to provide general-purpose processing functionality, or to provide specialized processing functionality optimized for particular types of instructions or workloads. FIG. 3 illustrates one example implementation of a single execution slice (ES) 34 and load/store slice (LS) 36, which may also be suitable for implementing all of the execution slices 34 and load/store slices 36 in processor core 22 in some embodiments of the invention.

In this embodiment, inputs from the dispatch queues are received via dispatch routing network 44 by a register array 100 so that operands and the instructions may be queued in an execution reservation station (ER) 107 disposed in an issue queue 106. In some embodiments, register array 100 may be architected to have independent register sets for independent instruction streams or SIMD instructions, while dependent register sets that are clones across multiple execution slices may be architected for instances where multiple execution slices are executing non-SIMD instructions or the same segment of an SIMD instruction for the same instruction stream(s). An alias mapper 102 may map the values in register array to any external references, such as write-back values exchanged with other slices over write-back routing network 46. A history buffer (HB) 104 may also be used to provide restore capability for register targets of instructions executed by execution slice 34. Result values selected from write-back routing network 46 and operand values from register array 100 may be selected by an arithmetic logic unit (ALU) input multiplexer 108 and operated on by an ALU 110. A result buffer 112 may receive results from ALU 110 and a multiplexer 114 may be used to make the value of result buffer 112 available to one or more channels of write-back routing network 46 that may be used by a next execution slice 34 processing a next instruction for the instruction stream or a load/store slice 36 to store the result, depending on the target of the operation. Multiplexer 114 may also provide connection to other execution slices via execution slice communication network 50. Write-back routing network 46 may also be coupled to ER 107, HB 104 and ALU input multiplexer 108 by a write-back buffer 116, so that write-back of resource values, retirement of completed instructions and further computation on results may be supported, respectively. Furthermore, in embodiments employing superslices, additional connectivity may be provided between the respective issue queues 106 of the execution slices disposed in a superslice to provide for coordination between execution slices supporting execution of a single instruction stream, e.g., as illustrated by interconnect 117 coupled between issue queue 106 and issue queue 106' of execution slice 34'.

For load/store (LS) slice 36, a load/store access queue (LSAQ) 118 may be coupled to write-back routing network 46, and a direct connection to write-back routing network 46 and LSAQ 118 may be selected by a multiplexer 120 that provides an input to a cache directory 124 of a data cache 122 from either LSAQ 118 or from write-back routing network 46. Connections to other load/store slices 36 may be provided by load-store routing network 52, which may be coupled to receive from data cache 122 and to provide data to a data unalignment block 126 of another load/store slice 36. A data formatting unit 128 may be used to couple load/store slice 36 to write-back routing network 46 via a buffer 130, so that write-back results may be written through from one execution slice to the resources of another execution slice. Data cache 122 may also be coupled to I/O routing network 48 for loading values from higher-order cache/system memory and for flushing or casting-out values from data cache 122.

Issue queue 106 generally includes issue logic that is configured to issue instructions dispatched to the issue queue by the dispatch routing network 44 to one or more execution pipelines in the execution slice 34, and in some embodiments, issue queue 106 is also capable of queuing and issuing load/store instructions to one or more load/store slices 36. As such, issue queue 106 generally includes dependency logic that tracks dependencies for queued instructions in order to determine when queued instructions are ready for execution. Further, in some embodiments, issue queue 106 may both broadcast and receive notifications of issued instructions broadcast by other issue queues to enable instruction dependencies to be tracked and resolved across multiple slices. In some embodiments, for example, issued instructions may be assigned unique identifiers, referred to herein as instruction tags (ITAGS), that may be communicated over communication paths between the various issue logic entities in a processor core to manage dependencies, e.g., using networks or interconnects 48, 50, or 117. Furthermore, in some embodiments some dependencies may be tracked and managed within the dispatch routing network 44 such that certain instructions are not dispatched until some dependencies are resolved.

Various modifications and/or enhancements may be made to the components illustrated in FIG. 3 in other embodiments. For example, in some embodiments, an execution slice may also include multiple internal execution pipelines that support out-of-order and/or simultaneous execution of instructions for one or more instruction streams, with the instructions executed by different execution pipelines being internal instructions implementing portions of instructions received over dispatch routing network 44, or may be instructions received directly over dispatch routing network 44, i.e., the pipelining of instructions may be supported by the instruction stream itself, or the decoding of instructions may be performed upstream of an execution slice. Multiple pipelines within a single execution slice may differ in design and function in some embodiments, or some or all pipelines may be identical, depending on the types of instructions that will be executed by a particular execution slice implementation. For example, in some embodiments specific pipelines may be provided for address computation, scalar or vector operations, floating-point operations, etc. It will be appreciated that various combinations of multiplexers may also be incorporated to provide for routing of execution results to/from a result buffer and routing of write-back results to write-back routing network 46, I/O routing network 48 and other routing network(s) that may be provided for routing specific data for sharing between slices or write-back operations sent to one or more load/store slices 36.

In addition, in some embodiments, write-back routing network 46 may be segmented and may have one segment taking the form of a cross-pointed set of eight busses that permits simultaneous bidirectional communication between each of even-numbered execution slices ES0, ES2, ES4 and ES6 and selected corresponding even-numbered ones of load/store slices LS0, LS2, LS4 and LS6 from FIG. 2. A cluster fence (not shown) may be used to couple this segment write-back routing network 46 to other write-back routing network segments of other groups (clusters) of execution slices and load/store slices, e.g., execution slices ES1, ES3, ES5 and ES7 and cache slices LS1, LS3, LS5 and LS7 of FIG. 2. Further, it will be appreciated that, with respect to bidirectional communication, a load/store slice used for write back of results for an execution slice may be different from a load/store slice used for loading of data, since the sequence of instructions may alternate between instruction streams and under such conditions it will generally be desirable to connect a load/store slice to a different execution slice when changing the execution slice used for executing the next instruction in a sequence for an instruction stream. In addition, the relationship between load/store slices and execution slices may be arbitrarily varied, e.g., for instructions referencing large amounts of data, multiple load/store slices may be assigned for loads, while for instructions modifying large numbers of values, multiple load/store slices may be assigned for result write-back operations. By providing a write-back routing network 46 that supports arbitrary connections between load/store slices and execution slices, segmented execution may be efficiently supported by enabling transfer of values from one or more generating slices to one or more receiving slices, which may be the same type of slice as the generating slice, or may be another slice type, e.g., special purpose slice(s).

Embodiments of the present invention may be implemented within the hardware and software environment described above in connection with FIGS. 1-3. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Figure 4:
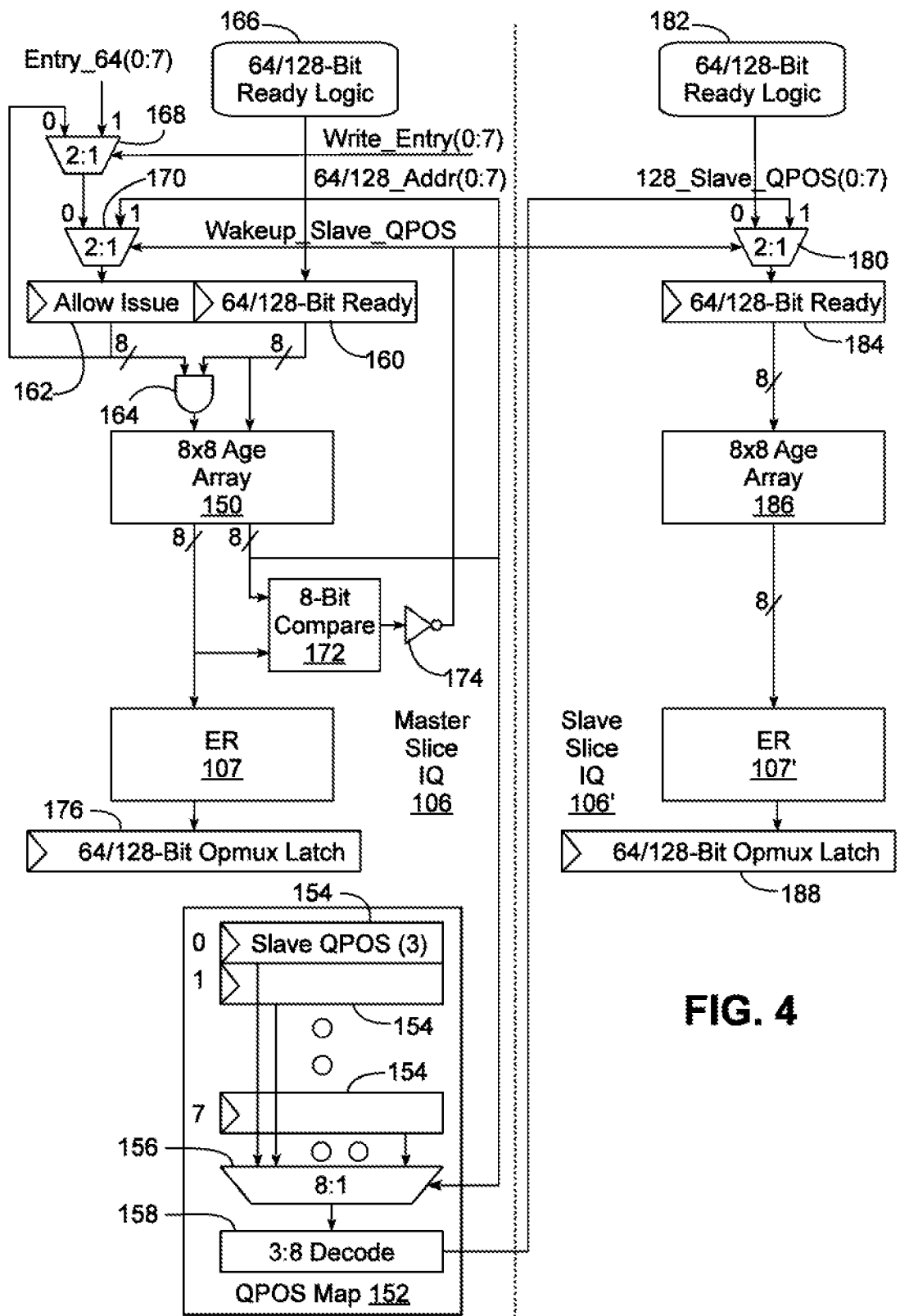
FIG. 4 is a block diagram illustrating a portion of an example implementation of the issue queues referenced in FIG. 3.

Now turning to FIG. 4, in embodiments consistent with the invention, fast issuance and execution of multi-width instructions across multiple slices is supported. To facilitate the issuance of multi-width instructions, an early issue notification signal is sent from a master slice for a multi-width instruction to one or more slave slices when a multi-width instruction is ready for execution in the master slice to enable each slave slice to prepare to issue the multi-width instruction at a predetermined future issue cycle. Concurrently with the communication of this early issue notification signal the master slice may also issue a different instruction that is also ready for execution to replace the multi-width instruction and thereby fill the bubble that would otherwise exist in an execution pipeline in the master slice. Then, upon occurrence of that future issue cycle, the multi-width instruction may be concurrently issued by the master slice and each of the slave slices.

In some embodiments, for example, a plurality of parallel execution slices, including at least first and second execution slices, are configured to execute instructions from one or more instruction streams. The first and second execution slices may be, in some embodiments, configured as master and slave slices forming a superslice, and each of the master and slave slices may include respective issue logic coupled thereto and configured to queue instructions dispatched to the respective execution slice and to issue queued instructions to the respective execution slice for execution thereby. In some embodiments, for example, the issue logic may include an issue queue that may store multiple (e.g., N) instructions dispatched to the respective execution slice and selectively issue the queued instructions based upon one or more issue criteria, such as issuing the oldest ready instruction during each issue cycle. In this regard, an issue cycle may be considered to be the interval over which the issue logic issues instructions, which in some embodiments may correspond to a clock cycle for the processor core.

Some of the instructions dispatched to, issued by, and executed by an execution slice, e.g., single width instructions, are considered to be non-multi-width instructions insofar as these instructions are not dependent on the execution of different parts of the instructions by multiple execution slices. In some embodiments, for example, the non-multi-width instructions include 64-bit instructions that match the 64-bit wide instruction pipeline(s) within each execution slice.

Other instructions dispatched to, issued by, and executed by an execution slice may include the aforementioned multi-width instructions, which include multiple portions that are dispatched to multiple execution slices are require coordinated dispatch and execution by the multiple execution slices. In the herein-described embodiments, these multi-width instructions may be 128-bit instructions incorporating two 64-bit parts, portions or halves that are dispatched to master and slave slices of a superslice, and that are respectively queued in each of the master and slave slices.

In the illustrated embodiments, the issue logic in one of the multiple execution slices to which a multi-width instruction has been dispatched (e.g., the master slice) is configured to initiate execution of the multi-width instruction by, in a first issue cycle, communicating an early issue notification signal to the issue logic for the other execution slice(s) to cause the issue logic in those slice(s) to prepare for issuance of the multi-width instruction during a second issue cycle (e.g., the next or subsequent issue cycle, or some multiple of issue cycles). Moreover, so that the master slice is not idle during the first issue cycle and while the other slice(s) are preparing for issuance of the multi-width instruction, the issue logic in the master slice may also issue a different queued instruction, i.e., a queued instruction other than the portion of the multi-width instruction, to the master slice for execution thereby. The different queued instruction may be, for example, non-multi-width instruction such as a single width instruction that is both queued and ready (i.e., not waiting on any dependencies) for execution. Thus, in a subsequent issue cycle, the issue logic in each of the execution slices may concurrently issue each of the portions of the multi-width instruction to the respective execution slices for execution thereby.

FIG. 4 illustrates in greater detail an example implementation of the issue queues 106, 106' of execution slices 34 and 34' of FIG. 3, which from the perspective of issuing a multi-width instruction are respectively referred to herein as master and slave slices, respectively. In this example, implementation, each slice 34, 34' includes an 8-entry issue queue (IQ) 106, 106' capable of issuing two 64-bit instructions per cycle: (1) a single Load/Store (LS) instruction for handling by a load/store slice 36 (not shown in FIG. 4), and a single Fixed Point (FX) or Vector/Scalar (VS) instruction for handling by an execution pipeline in an execution slice 34. For the purposes of this disclosure an FX instruction is a 64-bit or single width instruction and a VS instruction can be either a 64-bit single width instruction or a 128-bit or multi-width instruction, and these instructions are collectively referred to as 64/128-bit instructions to distinguish the fact that these instructions are of a type executed by an execution slice 34 as opposed to a load/store slice 36.

Each issue queue 106, 106' implements in a hardware circuit in the processor core issue logic capable of issuing for execution instructions that have been dispatched to the associated execution slice. The issue logic in each slice, as noted above, is configured to queue up to 8 instructions, and as such, the path widths and components within the issue logic is configured to manage 8 instructions in this implementation. As other queue sizes may be supported in other embodiments, the invention is not limited to the particular path widths and components supporting the queue size illustrated herein.

Queued instructions and the operands therefor may be stored at particular slots or positions in ER 107, 107', and each queued instruction may therefore be identified as being stored in a particular queue position (QPOS) in the ER.

For master slice IQ 106, an age data structure implemented as an 8×8 age array 150 is used to select the oldest ready LS instruction and the oldest ready FX/VS (64/128-bit) instruction for issue during each issue cycle. As noted above, VS instructions may be either 64-bit or 128-bit instructions, and for 128-bit VS instructions, the instruction is split into two 64-bit halves each residing in a separate execution slice. As such, at dispatch time, both halves of a 128-bit VS instruction are written into the Master and Slave slice IQs 106, 106'. Notably, however, since the two halves may not necessarily be written into the same position in the issue queue (QPOS) in each slice, IQ 106 for master slice 34 in the illustrated implementation is also written at dispatch time with a pointer to the QPOS in the slave slice 106' that corresponds to the other half of the 128-bit instruction.

In the illustrated embodiment, a QPOS map data structure 152 may be used to store the QPOS of a slave half of a 128-bit instruction. In some embodiments, this data structure may include 8 3-bit registers 154 respectively storing 3-bit encodings of the QPOS of a slave half of a 128-bit instruction, and indexed by the QPOS of a master half of that 128-bit instruction in the master slice. An 8:1 multiplexer 156 may be coupled to each register 154 and controlled via an 8-bit 64/128_Addr signal output by age array 150, and having a single asserted bit corresponding to the QPOS of the master half of the 128-bit instruction, and a 3:8 decoder 158 may be coupled to the output of multiplexer 156 to decode the 3-bit encoded QPOS of the slave half of a 128-bit instruction into an 8-bit value having a single asserted bit corresponding to the QPOS of the slave half of the 128-bit instruction.

Master slice IQ 106 includes an 8-bit 64/128-bit ready register 160 along with an 8-bit allow issue register 162. Register 160 feeds one input of age array 150, and another input of age array 150 is coupled to an 8-bit AND gate 164 that performs a logical AND of the outputs of registers 160 and 162. Register 150 stores the output of 64/128-bit ready logic 166 that, during each issue cycle, outputs a vector having a bit asserted for each among the 8 queued instructions that is both a 64/128-bit instruction and ready for issue (e.g., has all operand data ready and available, and has all dependencies (if any) resolved). Register 162, on the other hand, is updated at dispatch time by write logic to selectively assert an allow issue bit corresponding to the QPOS of a newly dispatched instruction, e.g., using a pair of multiplexers 168, 170 coupled to register 162.

Multiplexer 168, in particular, is an 8-bit wide 2:1 multiplexer having one input configured to receive an 8-bit Entry_64 signal and another input configured to receive the output of register 162, with an 8-bit Write_Entry signal used to select between the inputs. Multiplexer 170 is likewise an 8-bit wide 2:1 multiplexer having one input configured to receive the 64/128_Addr signal output by age array 150, and another input configured to receive the output of multiplexer 168. A Wakeup_Slave_QPOS signal, which in this implementation corresponds to an early issue notification signal, is used to select between the inputs of multiplexer 170, and is generated by an 8-bit compare of the two outputs of age array 150 that has been inverted by inverter 174.

At dispatch time, all new instructions in the master slice IQ 106 update the allow issue bit in register 162 corresponding to the QPOS of the new instruction in the master slice. For 64-bit instructions, the allow issue bit is set to 1, while for 128-bit instructions, the allow issue bit is set to 0. This is implemented for a new instruction received at QPOS X by setting the X bit of the Entry_64 signal to either 1 or 0 based upon whether the new instruction is a 64-bit or 128-bit instruction, along with asserting bit X of the Write_Entry signal to select the Entry_64 signal input in multiplexer 168, and assuming for the time being that the Wakeup_Slave_QPOS signal is not asserted at this time, such that bit X of allow issue register 162 is updated accordingly.

In general, on each issue cycle, the master slice performs two reads of age array 150: one that determines the oldest ready 64/128-bit instruction from age array 150 (based upon the ready vector stored in register 160) and one that determines the oldest ready 64/128-bit instruction from age array 150 that has its allow issue bit set to 1 (based upon the logical AND of the ready vector and allow issue bits respectively stored in registers 160, 162). The latter determination is output to ER 107 to cause that instruction to be stored in a 64/128-bit opmux latch 176 and subsequently issued, while both determinations are output to 8-bit compare block 172. Each of the reads from age array 150 generates an 8-bit, 1-hot read address, and thus, if the two read addresses are different, it indicates that there is a 128-bit instruction in master slice IQ 106 that is currently ready and older than a different 64-instruction that is also ready for issue. As a result, the 64-bit instruction is allowed to issue in parallel with the following additional operations that take place:

(1) the read address for the oldest ready 64/128-bit instruction generated from the output of register 160 is the aforementioned 64/128_Addr signal, and as noted above this signal is output to multiplexer 156 of QPOS map 152 to select and decode the QPOS corresponding to the half of the oldest ready 128-bit instruction that resides in the slave slice in an 8-bit 1-hot 128_Slave_QPOS signal output by decoder 158. This signal is received by one input of an 8-bit 2:1 multiplexer 184 in slave slice IQ 106', with the other input coupled to 64/128-bit ready logic 182 that, similar to logic 166 of master slice IQ 106, outputs a vector during each issue cycle having a bit asserted for each queued instruction that is ready to issue in the slave slice. The output of multiplexer 180 is stored in 64/128-bit ready register 184, which in turn outputs to an 8×8 age array 186. Register 184 and age array 186, similar to register 160 and age array 150 of master slice IQ 106, output an oldest 64/128-bit instruction queued and ready in the slave slice.

(2) an early issue notification signal, here the Wakeup_Slave_QPOS signal output by compare block 172 and inverter 174, is communicated to the slave slice IQ 106' by asserting the select input of multiplexer 180. As a result, on the subsequent issue cycle, slave slice ready logic 182 will be overridden, resulting in the QPOS selected by the 128_Slave_QPOS signal being output to slave slice age array 186, which in turn results in the slave half of the 128-bit instruction being addressed to ER 107' and output to a slave slice 64/128-bit opmux latch 188 for issuance.

(3) the Wakeup_Slave_QPOS signal is also concurrently output to the select input of multiplexer 170. Doing so causes multiplexer 170 to select the 64/128_Addr signal output by age array 150. As a result, on the subsequent issue cycle, the allow issue bit corresponding to the QPOS of the master part of the 128-bit instruction is asserted in register 162, causing the 128-bit instruction that is still considered to be the oldest 64/128-bit instruction in age array 150 to be output to ER 107 and passed along to 64/128-bit opmux latch 176, such that both halves of the 128-bit instruction are passed to latches 176, 188 in the same issue cycle.

As such, master slice IQ 106 will effectively broadcast an early issue notification signal for a 128-bit instruction one cycle prior to issuing the master half of the 128-bit instruction to latch 176, thereby "waking up" the slave half of the 128-bit instruction in slave slice IQ 106' early enough such that slave slice IQ 106' issues the slave half of the 128-bit instruction to latch 188 in the same issue cycle as the master half is issued to latch 176. Furthermore, even though the master half of the 128-bit instruction is effectively delayed one issue cycle as a result of the aforementioned sequence of operations, another 64-bit instruction that is ready for execution is inserted ahead of the 128-bit instruction.

Figure 5:
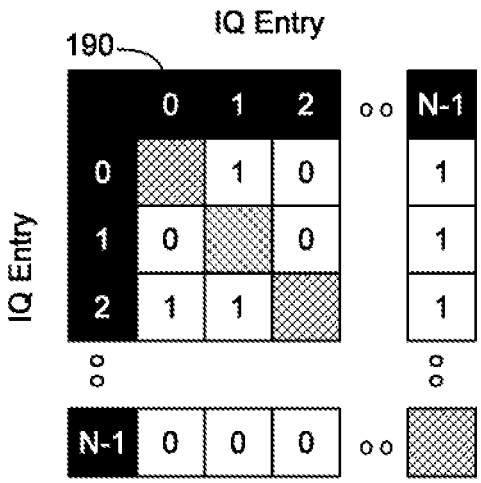
FIG. 5 is a block diagram illustrating an example implementation of one of the age arrays referenced in FIG. 4.

It will be appreciated that an age data structure such as age arrays 150, 186 may be implemented in a number of different manners in various embodiments. FIG. 5, for example, illustrates one example implementation of an age data structure 190 suitable for supporting N entries (numbered 0 . . . . N−1) in an issue queue. Data structure 190 is configured with a set of 1-bit latches indexed into N columns and N rows, with a "1" stored in a latch indexed at Row X and Column Y signifies that the entry stored in QPOS X is younger than the entry stored in QPOS Y.

On each cycle where a new instruction is dispatched and written into a QPOS entry in issue queue, each latch indexed by the QPOS row may be set, and each latch indexed by the QPOS column may be cleared, thus indicating that the new instruction is the youngest instruction in the issue queue. For example, FIG. 5 illustrates a new instruction that has been stored in QPOS=2 of the issue queue, such that each latch in row 2 is set and each latch in column 2 is cleared to indicate that the instruction is the newest instruction in the issue queue.

Also, on each cycle, an N-bit ready vector (with a "1" set for each entry that is ready for execution) may be used to read the age data structure and generate a 1-hot N-bit issue vector that selects the oldest ready entry in the issue queue, which may then be used to index the issue queue to access the oldest ready entry. The, for example, if a read of age data structure 190 of FIG. 5 is performed using a ready vector indicating that the instructions at QPOS=1 and QPOS=2 are both ready, the age data structure would return an issue vector having bit 1 set to indicate that the instruction at QPOS=1 was the oldest ready instruction.

It will be appreciated that other age data structures may be used. For example, logic "0" values may be used to designate newer instructions in some embodiments. In addition, given that matching entries across the top left to bottom right diagonal are necessarily opposite logical values, and given that the entries along that diagonal are meaningless in age comparisons, an age data structure need not be implemented with N×N latches, but may instead be implemented with fewer latches, e.g., 28 latches for an 8-bit age data structure. Other manners of representing the relative ages of instructions may also be used in other embodiments.

Figure 6:
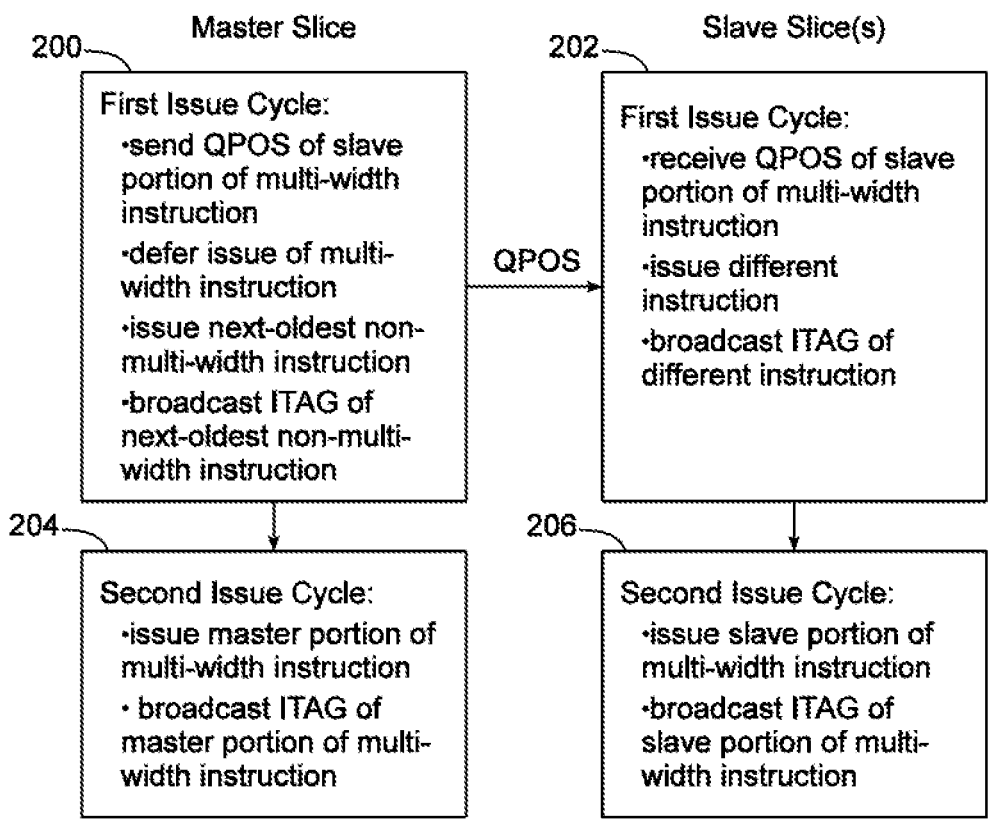
FIG. 6 is a flowchart illustrating an example sequence of operations for issuing a multi-width instruction in another example implementation of the processor core of FIG. 2.

Now turning to FIG. 6, another example implementation of a processor core that supports fast multi-width instruction issue is illustrated by way of a sequence of operations including blocks 200-206. Blocks 200, 202 represent operations performed during a first issue cycle by master and slice slices, respectively, while blocks 204, 206 represent operations by the master and slice slices in a second, subsequent issue cycle.

In particular, in this implementation, the issue queues of some or all of the execution slices may be configured to track the instructions issued by each execution slice and thereby track dependencies across slices. This tracking may be enabled by a broadcasting an identifier, referred to herein as an instruction tag (ITAG), for each instruction issued by an execution slice. In such an implementation, a QPOS signal such as described above, or another index or identifier for the multi-width instruction (e.g., of the queue position of the slave portion of the multi-width instruction in the slave slice issue queue), is again used as an early issue notification signal to effectively "wake up" any slave slices one cycle in advance of issuing a multi-width instruction by a master slice. It will also be appreciated that because each slice also receives the ITAGs for the instructions issued by other slices, each slice is able to track dependencies between instructions in its issue queue that may be waiting on the result of a previously issued instruction (from any of the slices) and can thus mark instructions as ready for issue based on such dependencies and the latencies of the producing instructions. It will also be appreciated that in some embodiments, slices may be grouped such that variable-latency ITAG broadcasts are performed, with slices assigned to the same group (e.g., 4 slices) receiving ITAG broadcasts faster than slices assigned to different groups. Further, it is also envisioned that in some embodiments, an ITAG signal may also serve as a type of early issue notification signal.

Thus, in the implementation of FIG. 6, during a first issue cycle during which a multi-width instruction is ready to be issued, the master slice in block 200 may, upon detecting that a multi-width instruction is the oldest instruction that is ready to be issued, send the QPOS of the slave portion of the multi-width instruction to the slave slices, thereby waking up the slave slice(s) to prepare for execution of their respective portions of the multi-width instruction. As shown in block 202, any slave slice that receives the QPOS of a multi-width instruction awaiting execution by that slice will be notified of the pending execution of the multi-width instruction during the next issue cycle. During the first issue cycle, however, the slave slice(s) may proceed with issuing other pending instructions as appropriate. In addition, each slave slice will also broadcast the ITAG of the instruction issued by that slave slice during the first issue cycle.

Returning to block 200, also during the first issue cycle, the master slice will defer issuing the multi-width instruction, and instead select another (e.g., a next-oldest non-multi-width) instruction for issue during the first issue cycle, as well as broadcast the ITAG of that next-oldest non-multi-width instruction. Thus, despite the deferral of the multi-width instruction for one cycle, another instruction is still issued by the master slice.

Next, in a second issue cycle, the master portion of the multi-width instruction is issued, and the ITAG for this instruction is broadcast in block 204. During the same cycle, as illustrated in block 206, the slave slice(s) will concurrently issue each slave portion of the multi-width instruction, and also broadcast the ITAG therefor. As such, it will be appreciated that in this embodiment, the master slice effectively notifies the slave slice(s) of the pending issue of a multi-width instruction one cycle early of the actual issue cycle for the instruction, with ITAG broadcasts occurring in the same cycles during which their associated instructions are issued.

Various modifications may be made to the illustrated embodiments without departing from the invention. For example, it will be appreciated that the use of the terms "master" and "slave" to refer to slices is only for the purpose of defining the roles of different slices when executing multi-width instructions. It will therefore be appreciated that in some embodiments different slices may assume master or slave roles for different instructions. In addition, while slices are referred to as being logically coupled into superslices in some embodiments, in other embodiments no specific logical coupling may be supported, and any arbitrary set of slices may be capable of collectively handling multi-width instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A circuit arrangement, comprising:
   a plurality of parallel execution slices configured to execute instructions from one or more instruction streams, the plurality of parallel execution slices including first and second execution slices;
   a first issue logic circuit of the first execution slice, the first issue logic circuit configured to queue instructions, dispatched to the first execution slice, in a first issue queue and to issue queued instructions for execution by the first execution slice, the first issue logic circuit further configured to queue a first portion of a multi-width instruction, dispatched to the first execution slice, in the first issue queue; and
   a second issue logic circuit of the second execution slice, the second issue logic circuit configured to queue instructions dispatched to the second execution slice in a second issue queue that is separate from the first issue queue and to issue queued instructions for execution by the second execution slice, the second issue logic circuit further configured to queue a second portion of the multi-width instruction, dispatched to the second execution slice, in the second issue queue;
   wherein the first issue logic circuit is further configured to initiate execution of the multi-width instruction by the first and second execution slices by:
      in a first issue cycle, communicating an early issue notification signal to the second issue logic circuit to cause the second issue logic circuit to prepare for issuance of the multi-width instruction during a second issue cycle;
      also in the first issue cycle, issuing a queued instruction other than the first portion of the multi-width instruction for execution by the first execution slice; and
      in the second issue cycle, issuing the first portion of the multi-width instruction for execution by the first execution slice; and
   wherein:
      the early notification signal comprises an instruction tag (ITAG) signal broadcast to the second execution slice to resolve any dependencies with other instructions;
      each of the first and second issue logic circuits is configured to broadcast an ITAG signal for each instruction issued thereby;
      wherein the first issue logic circuit is further configured to broadcast the ITAG signal for the multi-width instruction a cycle early to actual issuance of the multi-width instruction by the first issue logic circuit.

2. The circuit arrangement of claim 1, further comprising a dispatch logic circuit coupled to the plurality of parallel execution slices and configured to dispatch instructions from the one or more instruction streams to the plurality of parallel execution slices for execution thereby, the dispatch logic circuit further configured to dispatch the first and second portions of the multi-width instruction respectively to the first and second execution slices for execution thereby.

3. The circuit arrangement of claim 1, wherein the first issue logic circuit is configured to initiate execution of the multi-width instruction in response to determining that the multi-width instruction is an oldest instruction queued by the first issue logic circuit.

4. The circuit arrangement of claim 3, wherein the first issue logic circuit includes an age data structure that identifies an oldest instruction queued by the first issue logic circuit, wherein the first issue logic circuit is configured to update the age data structure in connection with queuing each instruction dispatched to the first execution slice, and to access the age data structure to determine that the multi-width instruction is the oldest instruction queued by the first issue logic circuit.

5. The circuit arrangement of claim 4, wherein the first issue queue includes N positions configured to queue up to N instructions, wherein the age data structure comprises an array of latches indexed into N rows and N columns, each of the N rows and N columns corresponding to a position among the N positions of the first issue queue, wherein the first issue logic circuit is configured to, in response to queuing the first portion of the multi-width instruction in position X among the N positions of the first issue queue, update the age data structure by setting each element in row X to a first value and setting each element in column X to a second value to indicate that the multi-width instruction in position X is a youngest instruction in the first issue queue.

6. The circuit arrangement of claim 4, wherein the circuit arrangement further includes:
- a ready register including a plurality of bits corresponding respectively to a plurality of queue positions in which a plurality of instructions are queued in the first issue logic circuit;
- a ready logic circuit configured to assert each bit in the ready register that corresponds to a queue position storing an instruction that is ready for issue;
- an allow issue register including a plurality of bits corresponding respectively to the plurality of queue positions; and
- a write logic circuit configured to, in response to dispatch of a non-multi-width instruction to the first execution slice, assert a bit in the allow issue register corresponding to a queue position in which the non-multi-width instruction is queued in the first issue logic circuit.

7. The circuit arrangement of claim 6, wherein the first issue logic circuit is configured to issue an instruction queued in a particular queue position only when the bits in the ready and allow issue registers corresponding to the particular queue position are asserted, and wherein the first issue logic circuit is configured to defer asserting the bit in the allow issue register corresponding to a position of the multi-width instruction until the second issue cycle to cause the first portion of the multi-width instruction to be issued for execution by the first execution slice in the second issue cycle.

8. The circuit arrangement of claim 7, wherein the first issue logic circuit is configured to assert the bit in the allow issue register corresponding to the position of the multi-width instruction in response to the early issue notification signal.

9. The circuit arrangement of claim 3, wherein the first issue logic circuit is configured to issue the queued instruction other than the first portion of the multi-width instruction by issuing an oldest queued non-multi-width instruction.

10. The circuit arrangement of claim 1, wherein the second issue cycle is immediately subsequent to the first issue cycle.

11. The circuit arrangement of claim 1, wherein the second issue logic circuit is further configured to:
- in the first issue cycle, receive the early issue notification signal from the first issue logic circuit;
- also in the first issue cycle, issue an other queued instruction for execution by the second execution slice; and
- in the second issue cycle, issue the second portion of the multi-width instruction for execution by the second execution slice.

12. The circuit arrangement of claim 1, wherein the first execution slice is a master slice and the second execution slice is a slave slice, and wherein the first and second slices comprise a superslice.

13. The circuit arrangement of claim 1, wherein each of the first and second execution slices is configured to process 64-bit single width instructions, wherein the multi-width instruction is a 128-bit instruction and each of the first and second portions of the multi-width instruction has 64 bits.

14. An integrated circuit chip comprising the circuit arrangement of claim 1.

15. A program product comprising a non-transitory computer readable medium and logic definition program code stored on the computer readable medium and defining the circuit arrangement of claim 1.

16. A method of executing instructions in a processor core including a plurality of parallel execution slices configured to execute instructions from one or more instruction streams, the method comprising;
- in a first issue logic circuit of a first execution slice among the plurality of parallel execution slices, queuing instructions, dispatched to the first execution slice, in a first issue queue and issuing queued instructions for execution by the first execution slice;
- in a second issue logic circuit of a second execution slice among the plurality of parallel execution slices, queuing instructions dispatched to the second execution slice in a second issue queue that is separate from the first issue queue and issuing queued instructions for execution by the second execution slice;
- queuing first and second portions of a multi-width instruction in the first and second issue queues of the first and second issue logic circuits, respectively; and
- in the first issue logic circuit, initiating execution of the multi-width instruction by the first and second execution slices by:
  - in a first issue cycle, communicating an early issue notification signal to the second issue logic circuit to cause the second issue logic circuit to prepare for issuance of the multi-width instruction during a second issue cycle;
  - also in the first issue cycle, issuing a queued instruction other than the first portion of the multi-width instruction for execution by the first execution slice; and
  - in the second issue cycle, issuing the first portion of the multi-width instruction for execution by the first execution slice;
- with the first issue logic circuit:
  - updating an age data structure that identifies an oldest instruction queued by the first issue logic circuit, wherein the updating is in connection with queuing each instruction dispatched to the first execution slice; and
  - accessing the age data structure to determine that the multi-width instruction is the oldest instruction queued by the first issue logic circuit.

17. The method of claim 16, further comprising, with the second issue logic circuit:
- in the first issue cycle, receiving the early issue notification signal from the first issue logic circuit;
- also in the first issue cycle, issuing a queued instruction for execution by the second execution slice; and
- in the second issue cycle, issuing the second portion of the multi-width instruction for execution by the second execution slice.

18. A circuit arrangement, comprising:
- a plurality of parallel execution slices configured to execute instructions from one or more instruction streams, the plurality of parallel execution slices including first and second execution slices;
- a first issue logic circuit of the first execution slice, the first issue logic circuit configured to queue instructions, dispatched to the first execution slice, and to issue queued instructions for execution by the first execution slice, the first issue logic circuit further configured to queue a first portion of a multi-width instruction dispatched to the first execution slice; and
- a second issue logic circuit of the second execution slice, the second issue logic circuit configured to queue instructions dispatched to the second execution slice and to issue queued instructions for execution by the second execution slice, the second issue logic circuit further configured to queue a second portion of the multi-width instruction dispatched to the second execution slice;

wherein the first issue logic circuit is further configured to initiate execution of the multi-width instruction by the first and second execution slices by:
- in a first issue cycle, communicating an early issue notification signal to the second issue logic circuit to cause the second issue logic circuit to prepare for issuance of the multi-width instruction during a second issue cycle;
- also in the first issue cycle, issuing a queued instruction other than the first portion of the multi-width instruction for execution by the first execution slice; and
- in the second issue cycle, issuing the first portion of the multi-width instruction for execution by the first execution slice;

wherein the early notification signal comprises an instruction tag (ITAG) signal broadcast to the second execution slice to resolve any dependencies with other instructions, wherein each of the first and second issue logic circuits is configured to broadcast an ITAG signal for each instruction issued thereby, and wherein the first issue logic circuit is further configured to broadcast the ITAG signal for the multi-width instruction a cycle early to actual issuance of the multi-width instruction by the first issue logic circuit.

* * * * *